(12) United States Patent  
Gabara

(10) Patent No.: US 7,986,230 B2  
(45) Date of Patent: Jul. 26, 2011

(54) APPARATUS AND METHOD FOR FINDING A MISPLACED OBJECT USING A DATABASE AND INSTRUCTIONS GENERATED BY A PORTABLE DEVICE

(75) Inventor: Constance Gabara, Murray Hill, NJ (US)

(73) Assignee: TrackThings LLC, Murray Hill, NJ (US)

( * ) Notice: Subject to any disclaimer, the term of this patent is extended or adjusted under 35 U.S.C. 154(b) by 1248 days.

(21) Appl. No.: 11/559,687

(22) Filed: Nov. 14, 2006

(65) Prior Publication Data

US 2008/0112591 A1    May 15, 2008

(51) Int. Cl.  
*G08B 1/08* (2006.01)

(52) U.S. Cl. ........... 340/539.32; 340/539.1; 340/539.11; 340/539.13; 340/539.25

(58) Field of Classification Search ............. 340/539.32, 340/539.1, 539.11, 539.13, 539.25  
See application file for complete search history.

(56) References Cited

U.S. PATENT DOCUMENTS

| | | | |
|---|---|---|---|
| 5,835,616 A | 11/1998 | Lobo | |
| 5,842,194 A | 11/1998 | Arbuckle | |
| 5,991,429 A | 11/1999 | Coffin | |
| 6,038,333 A | 3/2000 | Wang | |
| 6,349,898 B1 | 2/2002 | Leonard | |
| 6,799,163 B2 | 9/2004 | Nolan | |
| 7,113,089 B2 | 9/2006 | Ho | |
| 7,382,405 B2 * | 6/2008 | Kusaka et al. | 348/231.6 |
| 2003/0189646 A1 * | 10/2003 | Bean et al. | 348/207.99 |
| 2004/0086157 A1 | 5/2004 | Sukegawa | |
| 2004/0151347 A1 | 8/2004 | Wisniewski | |
| 2004/0174434 A1 * | 9/2004 | Walker et al. | 348/211.3 |
| 2006/0009167 A1 | 1/2006 | Meyer | |
| 2006/0083440 A1 * | 4/2006 | Chen | 382/284 |
| 2010/0258951 A1 | 10/2010 | Gabara | |

* cited by examiner

*Primary Examiner* — Daryl Pope

(74) *Attorney, Agent, or Firm* — Thaddeus Gabara

(57) ABSTRACT

The basic invention uses a portable device that can contain a camera, a database, and a text, voice or visual entry to control the storage of an image and its location into a database. The database can be distributed over several memory arrays in different devices. Furthermore, the stored image can be associated with text, color, visual or audio data. The stored images can be used to guide the user towards a target if the user does not recall the current location. The user's commands can be issued verbally, textually or by scrolling through the target images in the database until the desired one is found. This target can be shoes, pink sneakers, a toy or some comparable items, etc. that the user desires to find.

20 Claims, 8 Drawing Sheets

APPARATUS AND METHOD FOR FINDING A MISPLACED OBJECT USING A DATABASE AND INSTRUCTIONS GENERATED BY A PORTABLE DEVICE

CROSS-REFERENCE TO RELATED APPLICATIONS

The present application is related to the co-filed U.S. application entitled "APPARATUS AND METHOD FOR IDENTIFYING A NAME CORRESPONDING TO A FACE OR VOICE USING A DATABASE" filed on Nov. 14, 2006, which is invented by the same inventor as the present application and incorporated herein by reference in their entireties.

BACKGROUND OF THE INVENTION

Failing to remember where one placed an item can be frustrating. Many times, the remote control of a TV can't be found, finding a pair of missing pink sneakers causes one to miss catching the school bus on time, or losing a loved toy that requires love and huggies is a sad event.

The current method of locating these items is by an exhaustive physical search. As "Mom" is telling you to hurry up, the bus is coming, "where did you put your sneakers?" You get even more frantic. The search space you are viewing may in fact contain the sneakers but due to the rapidity and shortness of time, your brain fails to recognize it. Then you miss your bus. Now, your "Mom" has to drive you to school.

Several previous inventions address the problem of locating a target. One, U.S. Pat. No. 7,113,089, issued Sep. 26, 2006 describes a portable device that can be used to identify a target using wireless signals. The target and the portable device must have a wireless transponder inside of them. The user enters a desired target into the handheld and moves the handheld to locate the best signal strength and moves in that direction. Two weakness of this invention are 1) the target must contain a wireless transponder and 2) the method of locating the target uses a maximum wireless signal strength which can be inaccurate since reflections from walls may mislead the search for the target.

A second reference, U.S. Pub. No. 2006/0009167, filed Apr. 7, 2005 describes a technique for guiding a person along a path in an adverse environment such as a fire, chemical spill, etc. The user wears a protective suit and drops wireless transponders along the path they are moving along. The transponders are dropped from a backpack automatically at regular intervals and the user can use these transponders to find his way back. This is equivalent to the procedure that "Hansel and Gretel" used by dropping bread to find their way back from the woods. Unfortunately for "Hansel and Gretel", the birds ate the bread so they couldn't return. But in the second reference a wireless transponder is used not to locate a target but provide for a way of guiding a user along a path to get back to the beginning. As stated previously, the second reference does not offer a way of finding a target.

Visual target recognition is a matching algorithm that can compare a target with a stored version in the database in an attempt to get a match. Aircraft and missiles used visual guidance systems can use a visual display to find a target as described in U.S. Pat. No. 6,349,898, issued Feb. 26, 2002. The visual system is used guide the missile to the target. The target recognition system inside the missile is used to control and direct the missile to its target for ultimate destruction. However, the user needs to see the target before releasing the missile. If the target's location is already known before the release of the missile, then the target is not lost. This is in contrast to the description of the invention in this application where the target's location is not known to the user.

It is desirable to have a tool that can look for and find lost items so that life can continue at its normal pace. Since many lost items do not contain an RF tag or wireless transponder a different way of locating these lost items is required. It is the purpose of this invention to find a target that does not have wireless tags or any type of wireless devices embedded in the desired or possible lost target.

BRIEF SUMMARY OF THE INVENTION

The invention described in this application is a portable device that is used to locate a target that has been lost or misplaced without forming a wireless link between the portable device and the misplaced target. Thus, the target does not necessarily contain a wireless tag or wireless transceiver embedded in the lost target. This target is an object that typically can be easy to move (mobile); such as, a remote control for a TV, a small toy, headgear, shoes, sneakers, school books, back pack or homework papers. Mobile in this case implies that the target can be picked up, used, moved, and set down in a new location in a very short period. Typically, the new location where the target is placed is quickly forgotten and the user cannot locate the target when they require it at a later date. The invention stores the association of the current location along with the target and places this association into a database.

Immobile objects can be recognized and used to provide key position anchor locations. These immobile objects can create a framework within the database to help navigate the user to its target. The next level of immobile objects such as a table, refrigerator, couch, etc. are less immobile but can serve as a secondary level of anchor framework to also help move the user through the environment to help location the target object. The locations of the very mobile objects are compared to the two levels of immobile objects and a relative position is recoded in the database.

The target may have had already existed in the database if it was stored at an earlier date. The user can locate the target in the portable device by using voice activation or textual commands. In addition, a visual image can be scrolled on the display screen of the portable device to identify a previously stored target. If the portable device does not recognize the new target in the database of the portable device, then the user issues a prompt to store the new target into the database.

Once a desired target is required, and the user can not locate the target, then the user uses the portable device in an attempt to identify the target's location. The portable device determines the current location of the user after the user desires to locate the target. The portable device analyzes its database to locate the target and directs the user to move in a given direction as specified on the display screen of the portable device. The portable device continuously updates the current location of the moving user as the target is being approached. Once the target is located, it is used for the particular function that the target offers, i.e. put sneakers on feet.

In some cases, the target may have been moved by another user in the house. This second user also uses their portable device. Thus, since target has been moved by a different user and not the original user, the location of the target is contained within this different user's handheld database. Since the database can exist within the portable device, in a PC, in a server, or the database that is contained in another user's portable device; the first user's portable device can query these databases including the different user's database and update the first user's database. There will have to be timestamps on all items that are stored into the database to insure that the newest location is used.

The portable device can also use voice, textual or images presented to the user by the portable device to locate a misplaced target. One image is an arrow pointing in the correct direct, while another is a visual display of the current location highlighting a door which should be entered. A third method is coloring the display screen with shades of color; blue for cold, yellow for warm and red for hot. The portable device can also issue verbal commands to direct the user or textual instructions displayed on a display screen of the portable device.

This invention has several advantages; 1) the target does not require a wireless transponders; thus if the battery of the transponder losses power, this new invention can still find the object, 2) as one target is being searched, other targets in the database can be located and confirmed to be at the known location, 3) if a target can not be located in the expected location (i.e., a different user moved it), the database of other users can be searched to potentially located it; thus, the target can be located even if the target is moved by a different user. This is particularly advantageous if other people reside in the same residence and move the target, 4) the portable device only requires a search and compare algorithm to locate the target, 5) several different instructional means (textual, visual, colored screen, or audio) can be specified to emanate from the portable device to help give instructions to locate the target.

With the prevalence of portable devices and the increase in computational ability of many portable devices, the ability of finding lost targets can be implemented into a portable device that contains a local database.

DETAILED DESCRIPTION OF THE INVENTION

Figure 1A:
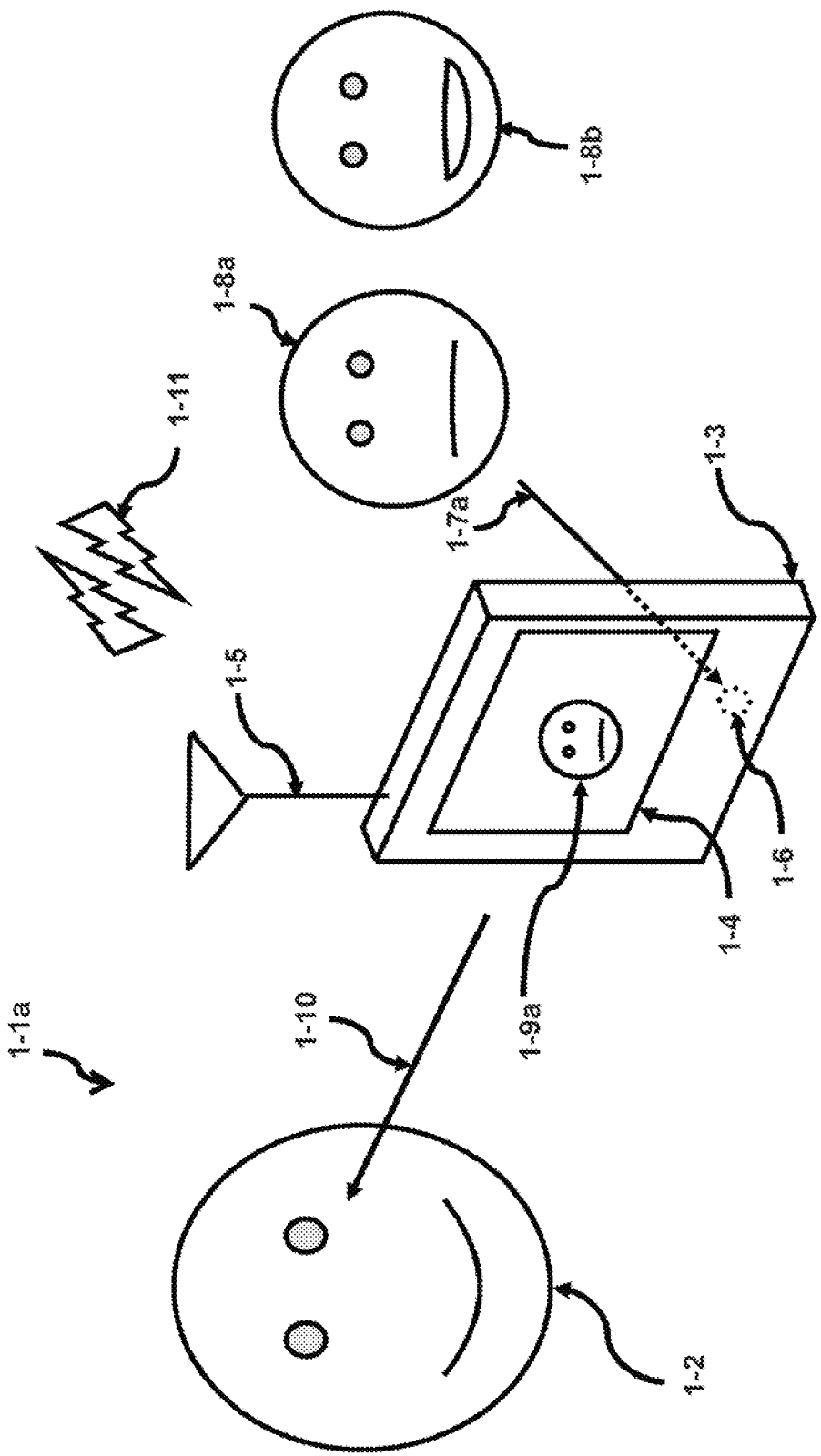
FIG. 1a illustrates a prior art apparatus displaying an image on the display screen of a portable device.

FIG. 1a provides a prior art view 1-1a of a user 1-2 viewing a portable device 1-3 to display an image 1-9a on the display screen 1-4. The portable device 1-3 also contains at least one antenna 1-5 and a database (not shown). The wireless signal 1-11 can be used to connect to a second external database to obtain additional information. The portable device 1-3 also contains a camera 1-6. This portable device 1-3 can be a cell phone, a PDA device, or any device that contains a display component, antenna and a camera. The display screen 1-4 can be an LCD, TFT, or any comparable display.

An image propagation path 1-7a of a first target 1-8a is sensed by the camera 1-6. The image 1-9a is displayed in accordance with the present invention played on the display screen 1-4 to the user 1-2. The captured image propagation path 1-10 is sensed by the user 1-2.

Although the targets are illustrated using faces, these targets can be an item in the vicinity of the user; for instance, window, box, shoe, doll, table, door, etc.

Figure 1B:
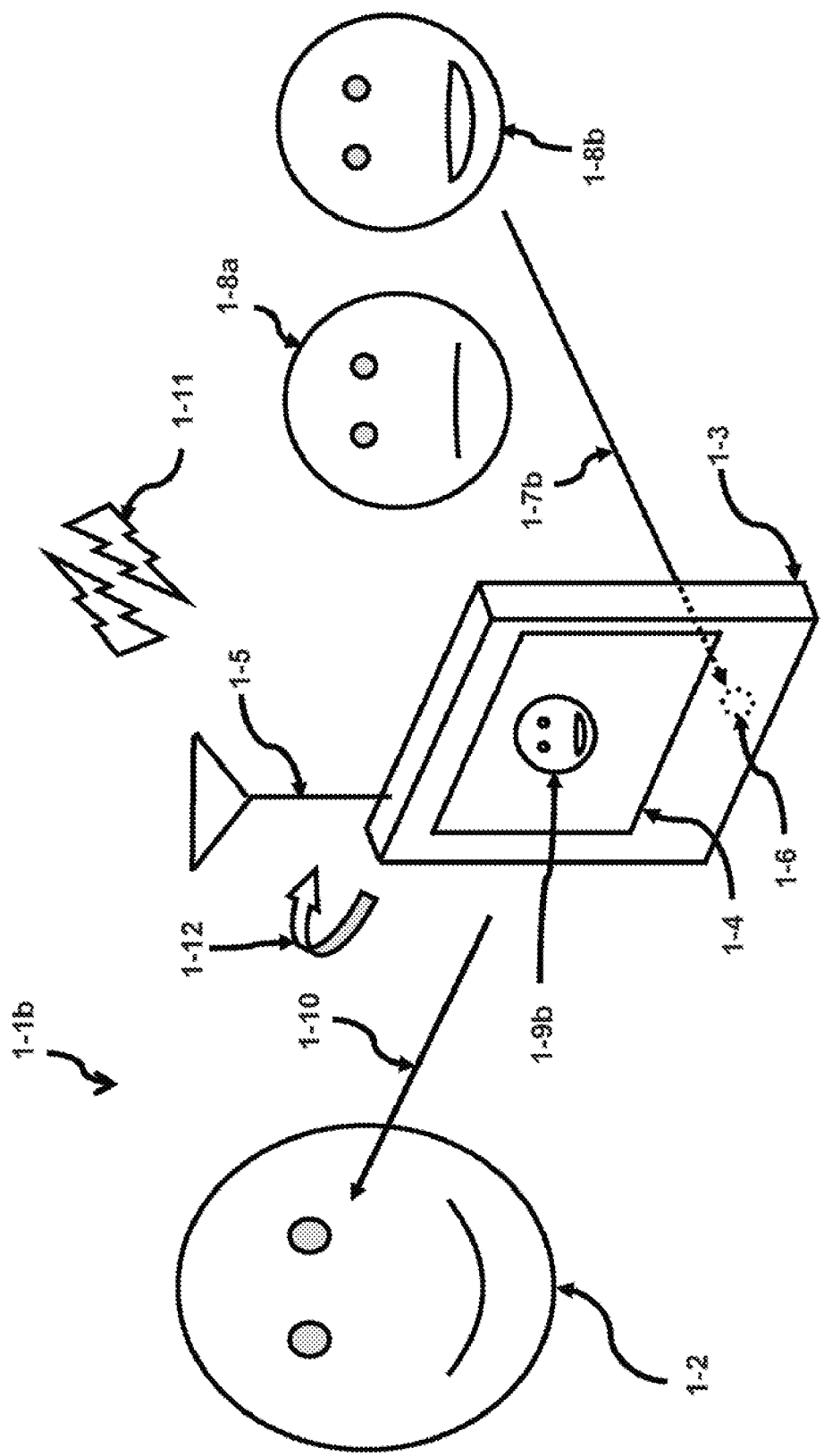
FIG. 1b depicts a prior art apparatus displaying a second image on the display screen of a portable device after rotation.

All of the components identified with the same numeric throughout these drawings corresponds effectively to the same component or item. For example, in FIG. 1b another prior art drawing 1-1b is illustrated. The portable device 1-3 is rotated 1-12 to capture the image of a second target 1-8b. An image propagation path 1-7b of a second target 1-8b is sensed by the camera 1-6. The image 1-9b is displayed on the display screen 1-4 to the user 1-2. The captured image propagation path 1-10 is sensed by the user 1-2.

Figure 2A:
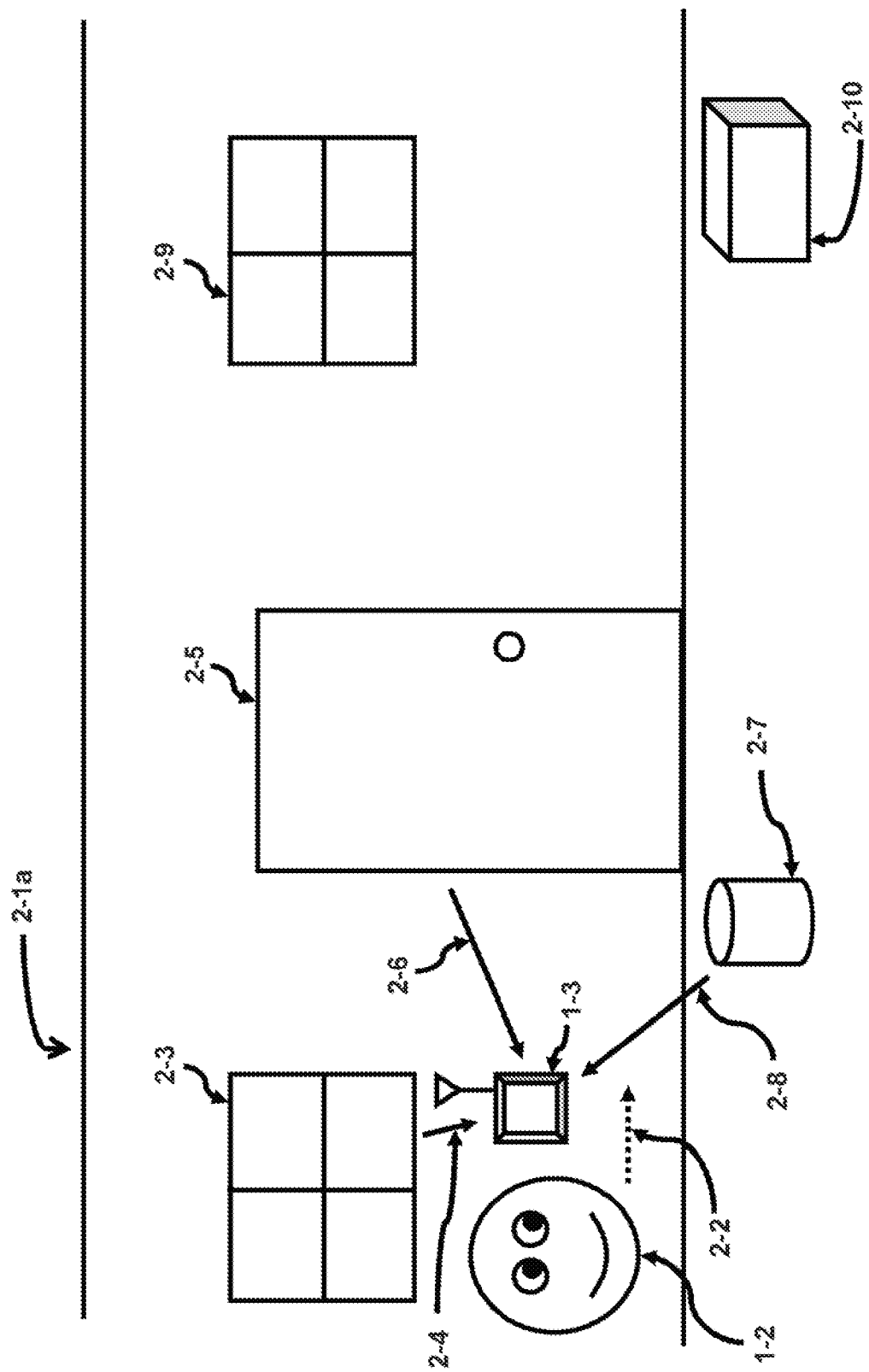
FIG. 2a shows a user carrying a portable device that collects images and stores them into memory made in accordance with the present invention.

FIG. 2a shows a portion of a hallway 2-1a. One wall contains a first window 2-3, a door 2-5 and a second window 2-9. Note that these are immovable targets in the sense that they would require major renovations to the hallway to move these targets into different locations. For instance, a contractor would be called into reposition the window 2-9 three feet lower. Thus, some targets are more permanent to a first degree than other targets.

In FIG. 2a, two targets 2-7 and 2-10 are also in the hallway 2-1a. These targets are easier to physically move from their initial location. The user 1-2 moves the portable device 1-3 along the hallway 2-1a recording the images of the various targets; both immovable and moveable. The software embedded in the portable device is intelligent and can make a decision that a window or door is more permanent and show be used to navigate the user through the hallway at a later date.

In addition, as each target is captured as an image, the user identifies the target. For instance, the image 2-4 is identified by the user 1-2 as a window, the image 2-6 is identified as a door, and image 2-8 is identified as doll. Each identified item can be recalled on the portable device at a later date using text, voice or viewing a set of images on the portable device's screen.

The portable device collects the image 2-4 of the window 2-3. The image 2-6 of the door 2-5 is stored and the image 2-8 of the first target 2-7 is captured. Note that the portable device is in motion 2-2 with the user 1-2.

Figure 2B:
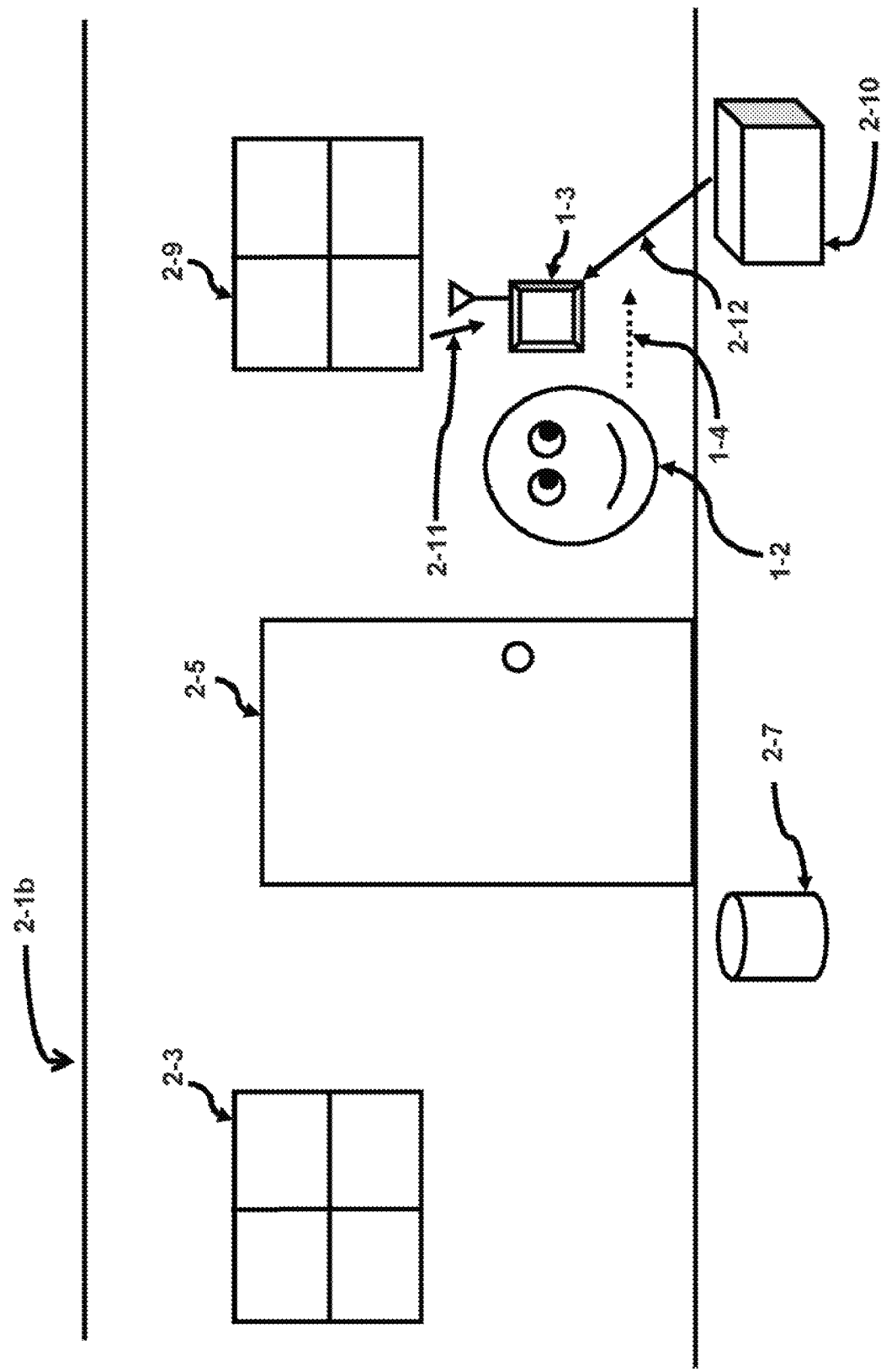
FIG. 2b illustrates the user moving across the room and collecting and storing addition images of items along the path made in accordance with present invention.

In FIG. 2b, the user 1-2 is now recording the image 2-11 of the window 2-9 and the image 2-12 of the second target 2-10. In this case, the user 1-2 does not identify the target as a pink sneaker. Only the image of the pink sneaker is stored in memory. The user is shown to be in motion 1-4, although this action may not always be required.

Figure 3A:
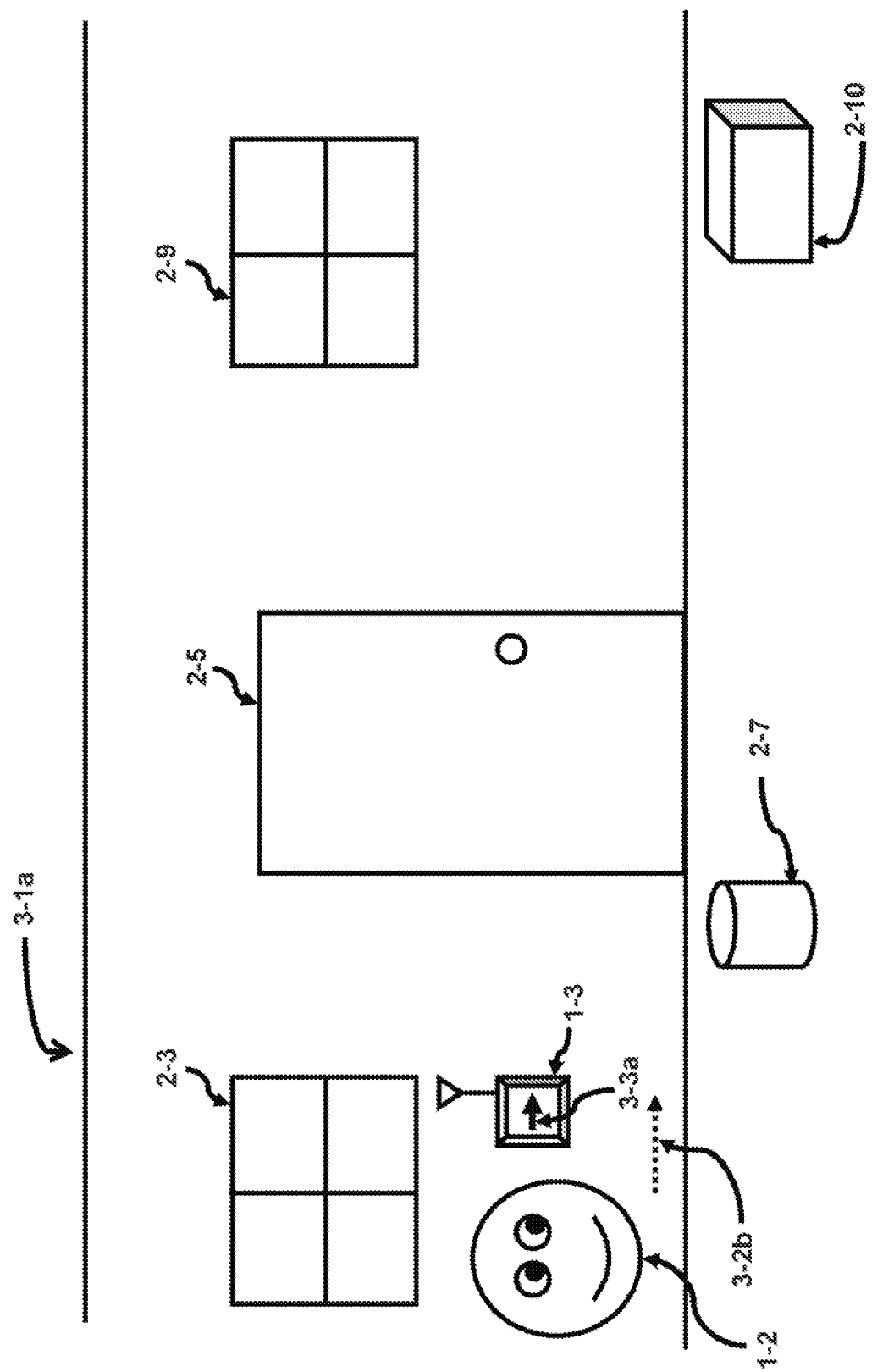
FIG. 3a depicts the user attempting to use the portable device to locate an object in accordance with the present invention.

In FIG. 3a, the user enters the desire to locate the pink sneaker into the portable device via text or voice. Since the association of the sneaker with either test or voice has never been made currently or at an earlier date, the user 1-2 then scans the images in the database for the image of the sneaker and finds the pink sneaker. The user 1-2 requests the portable device 1-3 to provide directions to the user 1-2. The command can be a button on the portable device that is depressed while the display unit shows the sneaker or a voice command can be used to start the search.

The portable device 1-3 illustrating the direction the user 1-2 should move. These directions can be an arrow 3-3a displayed on the display screen. The user 1-2 follows the arrow 3-3a. The arrow 3-3a directs the user to move 3-2b along the hallway 3-1a. The portable device views the environment and compares it to the database that was generated at an earlier date.

Figure 3B:
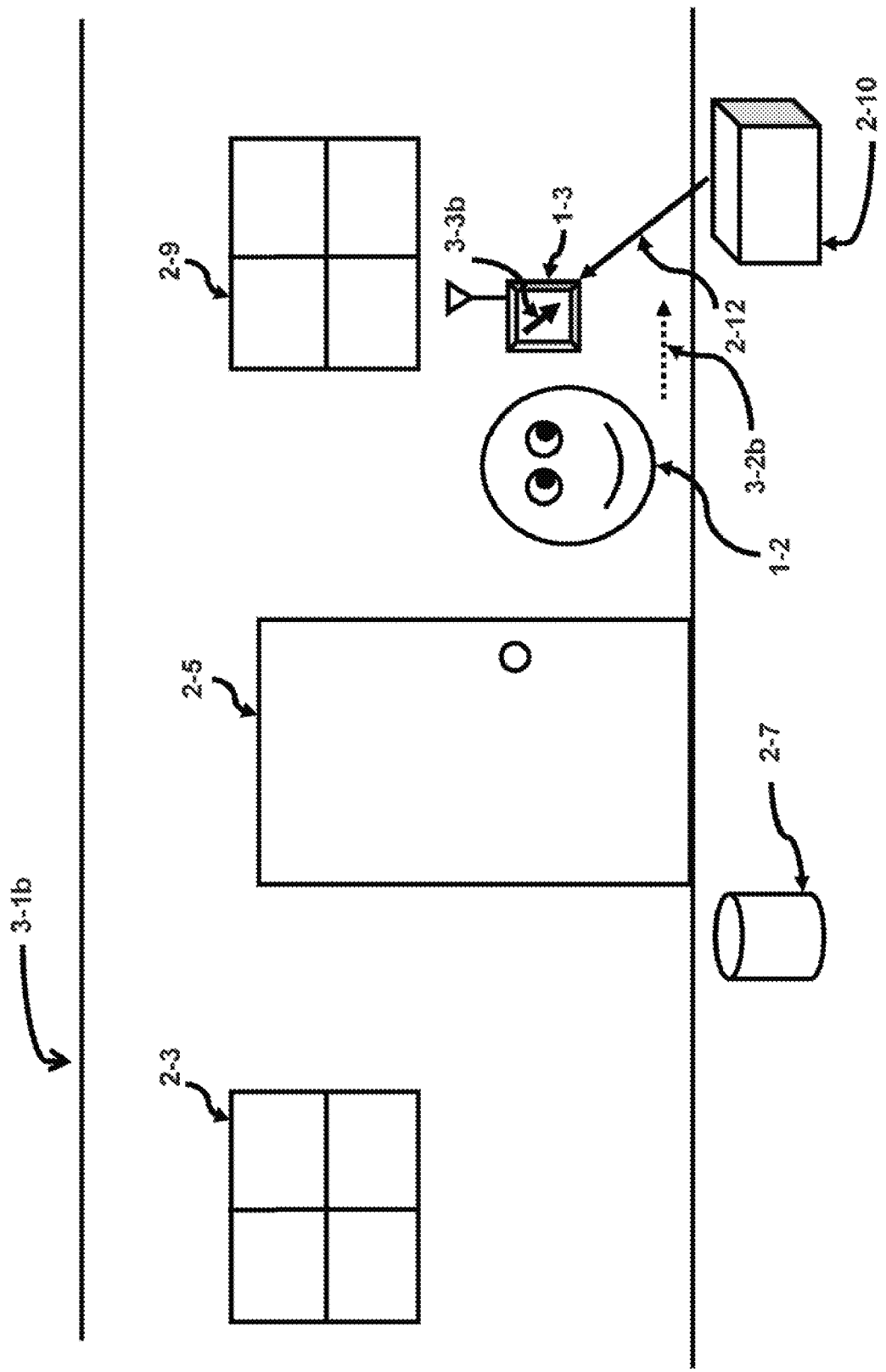
FIG. 3b shows the user being directed to the object via the display screen in accordance with the present invention.

FIG. 3b shows the user 1-2 viewing the screen and monitoring the arrow 3-3b indicating that the target 2-10 is the item of interest. As pointed out earlier, the target 2-10 was equivalent to the sneaker. Thus, the user 1-2 can now quickly get dressed and make it to school on time. Otherwise, without the use of the invention, she would be late for the bus and miss a day of school.

Figure 4:
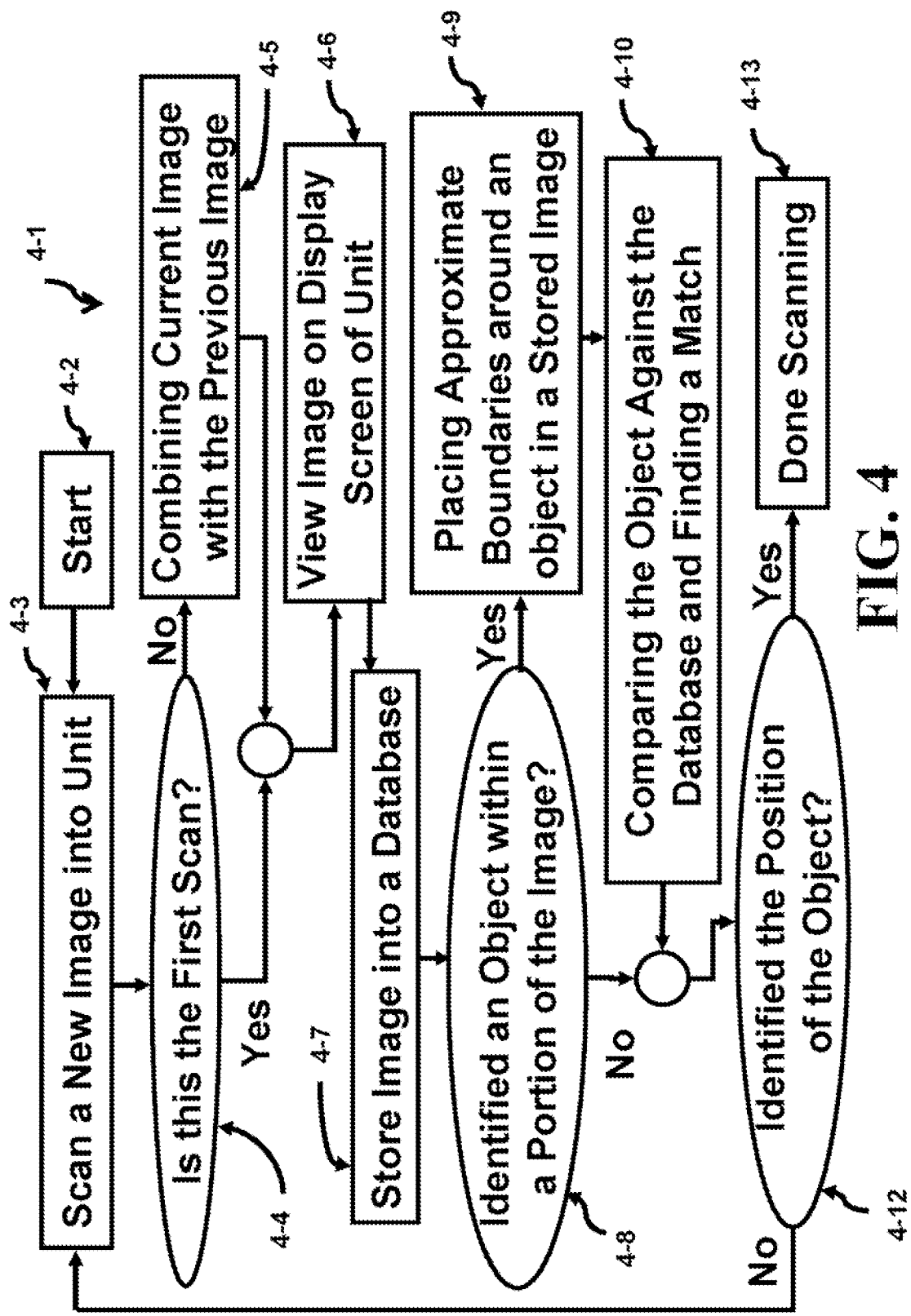
FIG. 4 illustrates a flowchart indicating the scanning procedure in accordance with the present invention.

A flowchart 4-1 is depicted in FIG. 4 that describes the scanning process. Moving from the block 4-2 to the block 4-3 causes a new image to be scanned into the portable device. Block 4-4 determines if this is the first scan. If not, then block 4-5 connects the current image with the previous image. Otherwise, block 4-6 indicates that the image is viewed on a display screen. Then, 4-7 indicates that the entire image is stored into a database. A decision block 4-8 determines if an object is identified in the image. If so, block 4-9 places boundaries around the object in the stored images. These component images that have been identified are associated with windows, doors, shoes, etc. Then, block 4-10 compares the object with the database and finds a match. The decision blocks 4-12 checks if the position of the object has been identified. If not, then move the block 4-3; otherwise, the block 4-13 is entered and the scanning is complete.

Figure 5:
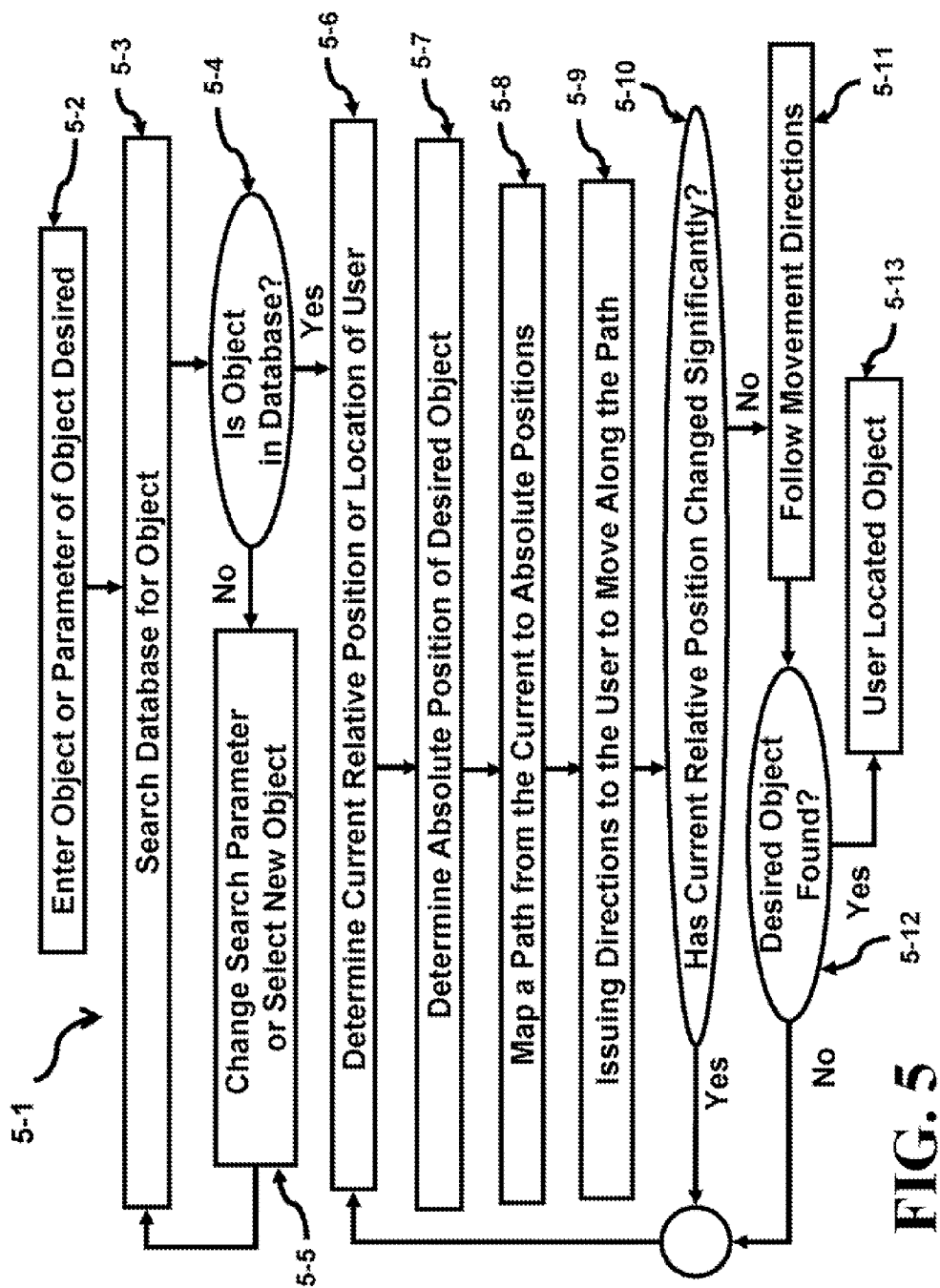
FIG. 5 depicts a second flowchart giving the procedure to location an object in accordance with the present invention.

A second flowchart 5-1 is illustrated in FIG. 5. Block 5-2 enters the object into the portable device. The next block 5-3 searches the database for this object. The search (not shown) can be textual, verbal or visual. A decision block 5-4 determines if the object is in the database. If not alter the search parameter or select a new object as block 5-5 indicates.

Otherwise, enter block 5-6 to determine the user's current position by scanning the surrounding area and matching the images to the stored scan made at an earlier time. Then, block 5-7 determines the absolute position of the desired object within the database. In block 5-8, an algorithm then maps a path from the current location to the absolute position. Control moves to block 5-9 where directions are issued to the user to move along the path.

A decision block 5-10 determines if the current relative position has changed significantly. If so, return to block 5-6 to improve the estimate of the relative position. Otherwise, follow the directions as given in block 5-11. If object has not been found, as indicated in the decision block 5-12, return to block 5-6 to achieve a better estimate. Otherwise, the directions have located the object as indicated in block 5-13 and the process of locating the object is complete.

It is understood that the above descriptions are only illustrative of the principles of the current invention. In accordance with these principles, those skilled in the art may devise numerous modifications without departing from the spirit and scope of the invention. In addition, the portable device can always be searching the environment while the user is moving around their environment in a non-search mode; this allows a continuous update to the very mobile object in case someone else has moved these objects. Thus, the database will always be updated as the portable device is moved from one location to the next. The portable device can be embedded into a small form factor (i.e., remove the display screen, for example) and placed in a pair of glasses or into the ear canal. The commands in this later case would be audio and the unit can then always view the environment and continuously update the database. The portable device can be a flip-phone, an iPod, Blackberry or any wireless handheld unit. Finally, the database can be fully contained in the portable device or may exist though a wireless access such as Bluetooth, 802.11, UWB, or a similar wireless protocol in another portable device, a personal computer or a server.

What is claimed is:

1. A method of allowing a user of a portable device to find an object comprising the steps of:
 searching a database for an absolute location of the object;
 determining a current location of the user;
 determining an absolute position of the object;
 mapping a path from the current location to the absolute position; and
 issuing directions for the user of the portable device to move along the path; thereby
 allowing the user to find the object.

2. The method of claim 1, further comprising the steps of moving the device to scan additional images; and
 combining the additional images with a previous image.

3. The method of claim 1, wherein
 the directions are displayed on a display screen of the portable device.

4. The method of claim 1, wherein
 the directions are audibly emitted from the portable device.

5. The method of claim 1, wherein
 a current position of the object is determined by a recognition algorithm.

6. The method of claim 1, wherein
 the absolute position of the object is determined by a recognition algorithm.

7. A portable device allowing a user to find a target comprising:
 a database containing a plurality of objects each with an absolute position;
 a current location of the user is determined from the database;
 the target is selected from the plurality of objects;
 a path mapped from the current location to the target; and
 the user of the portable device moves along the path, thereby
 allowing the user to find the target.

8. The apparatus of claim 7, whereby
 the portable device is moved to scan additional images and the additional images are combined with images scanned at an earlier time.

9. The apparatus of claim 7, further comprising
 a recognition algorithm determining the absolute position of the plurality of objects.

10. The apparatus of claim 7, wherein
 a current absolute position of at least one object is compared to its previous absolute position that was stored in the database at an earlier date.

11. The apparatus of claim 10, wherein
 a difference in comparison updates the object in the database from the previous absolute position to the current absolute position.

12. The apparatus of claim 11, wherein
 the database is shared with other users.

13. The apparatus of claim 7, wherein
 the directions are provided audibly, visually or both audibly and visually by the portable device.

14. A portable device allowing a user to find a target comprising:
 a database containing absolute positions and corresponding images of objects;
 the absolute position of the target is selected from the database;

a current location of the user is determined by scanning a surrounding area and matching images of objects to images in the database that were scanned at an earlier time;

a path mapped from the current location to the absolute position of the target; and the user of the portable device moves along the path; thereby allowing the user to find the target.

15. The apparatus of claim 14, whereby a new image scanned by the moving portable device and the new image is combined with previous images.

16. The apparatus of claim 14, further comprising a recognition algorithm determining the absolute position of the target.

17. The apparatus of claim 14, wherein a current absolute position of at least one object is compared to its previous absolute position that was stored in the database at an earlier date.

18. The apparatus of claim 17, wherein a difference in comparison transfers the object in the database from the previous absolute position to the current absolute position.

19. The apparatus of claim 18, wherein the database is shared with other users.

20. The apparatus of claim 14, wherein the directions are provided audibly, visually or both audibly and visually by the portable device.

\* \* \* \* \*